United States Patent

[11] 3,574,987

| [72] | Inventors | Sigmund P. Skoli<br>Elmwood Park;<br>Chester J. Witt, Deerfield; Harry G.<br>Mojonnier, River Forest, Ill. |
|---|---|---|
| [21] | Appl. No. | 12,900 |
| [22] | Filed | Feb. 18, 1970 |
| [45] | Patented | Apr. 13, 1971 |
| [73] | Assignee | Mojonnier Bros. Co.<br>Chicago, Ill.<br>Continuation of application Ser. No.<br>738,704, June 30, 1968, now abandoned. |

[54] VACUUM DEAERATOR DEVICE
2 Claims, 2 Drawing Figs.

[52] U.S. Cl. .................................................. 55/193
[51] Int. Cl. .................................................. B01d 19/00
[50] Field of Search .......................................... 55/42, 55, 193, 199, 206; 99/273; 165/115;

[56] References Cited
UNITED STATES PATENTS

| 2,040,947 | 5/1936 | Mojonnier et al. ........... | 165/115X |
| 2,057,298 | 10/1936 | Feldmeier .................... | 165/115X |
| 2,169,054 | 8/1939 | Mojonnier..................... | 165/115X |
| 2,428,044 | 9/1947 | Sharp et al..................... | 99/273X |

Primary Examiner—Samih N. Zaharna
Assistant Examiner—R. W. Burks
Attorney—Olson, Trexler, Wolters and Bushnell ABSTRACT: A vacuum deaerator including an enclosed, evacuated housing having an inlet at the upper end thereof and an outlet at the lower end. The deaerator includes a series of plate assemblies mounted within the housing in superposed relationship, as follows: a first, heating assembly mounted immediately below the inlet to heat incoming liquid to a predetermined temperature; a second assembly which receives the heated liquid from the first assembly to expose said liquid to the vacuum established within the housing and thereby thoroughly deaerating said liquid; and a third, cooling assembly disposed beneath the second assembly which receives the deaerated liquid and cools same to a predetermined temperature in preparation for carbonation of said liquid.

Patented April 13, 1971 3,574,987
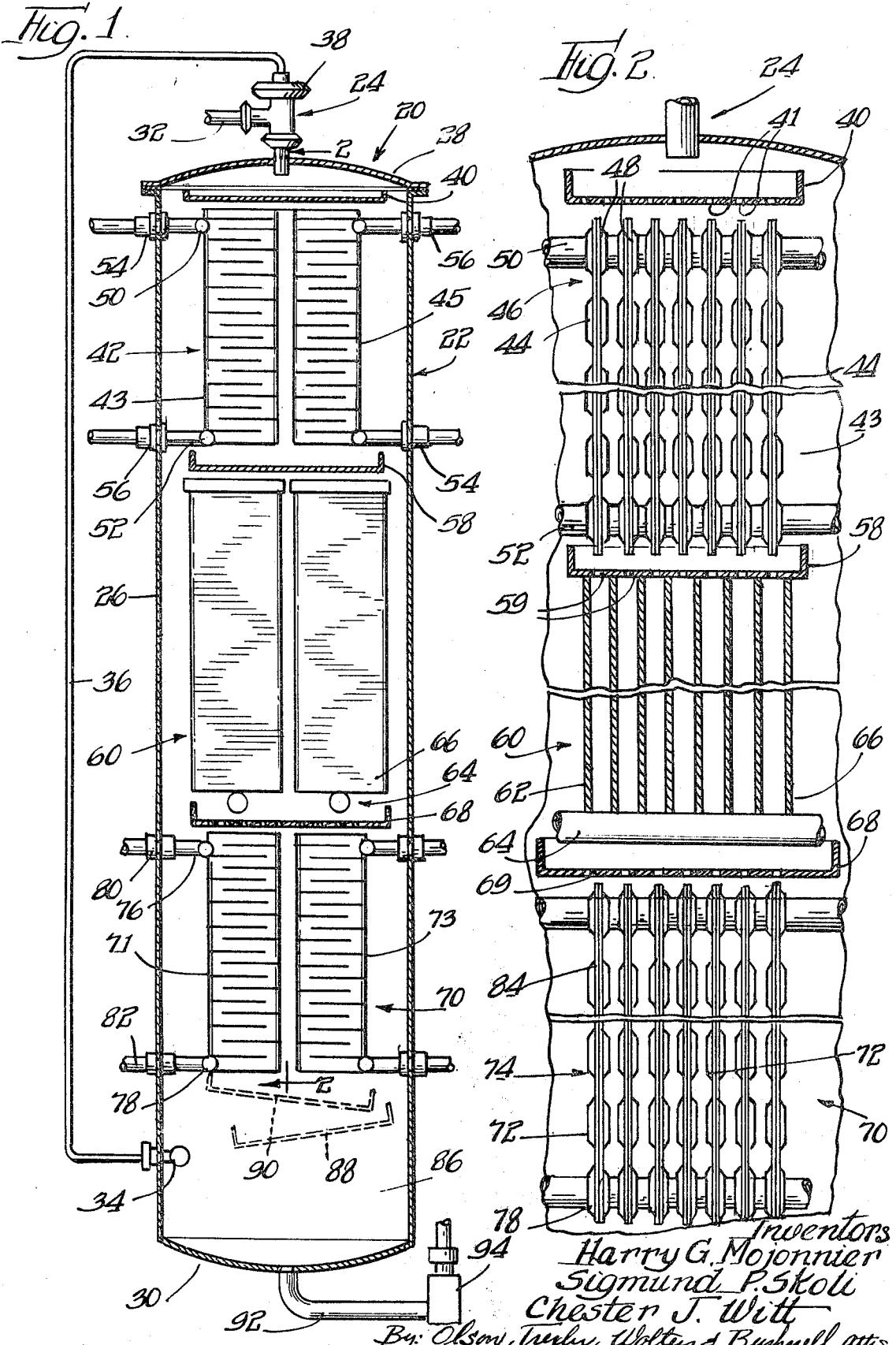
Inventors
Harry G. Mojonnier
Sigmund P. Skoli
Chester J. Witt
By: Olson, Trexler, Wolters & Bushnell attys

VACUUM DEAERATOR DEVICE

This is a continuation of applicants' copending application Ser. No. 738,704, filed Jun. 30, 1968, and now abandoned.

BACKGROUND OF THE INVENTION

This invention relates generally to deaerator devices and more particularly to vacuum deaerators.

Water deaerated in vacuum deaerators has many uses, one being in the production of carbonated beverages, such as, for example, cola or the like drinks.

In bottling carbonated beverages, especially in steel cans which are now used widely, the carbonated water in the beverages must be relatively air free to prevent rusting of the cans. Also, the water must be uniformly deaerated prior to carbonation in order to produce a uniformly carbonated beverage.

It has been found that water which has a higher temperature is more easily deaerated, and water which has a cooler temperature is more easily carbonated.

SUMMARY OF THE INVENTION

Accordingly, it is a primary object of this invention to provide a new and improved vacuum deaerator which produces water that is uniformly deaerated and of a proper temperature for combining a predetermined amount of carbon dioxide therewith.

Briefly, a preferred embodiment of a vacuum deaerator according to the invention includes an evacuated housing or tank in which there are located three plate assemblies arranged in a vertically descending order. Water entering the housing at the top thereof, passes over the first plate assembly and is heated thereby to a predetermined temperature suitable for uniformly deaerating the water. The water then passes over the deaerating plate assembly and is deaerated in a well-known manner, and after the water is deaerated, is passed over the third plate assembly which cools the deaerated water to a temperature suitable for a predetermined degree of carbonation thereof.

DESCRIPTION OF THE DRAWINGS

A better understanding of the present invention and its organization and construction may be had by referring to the description below in conjunction with the accompanying drawings, wherein:

FIG. 1 is an axial sectional view of a vacuum deaerator according to the invention; and FIG. 2 is an enlarged axial sectional view of the vacuum deaerator of FIG. 1, taken along the line 2—2 thereof.

DETAILED DESCRIPTION

Referring now to the drawings more in detail, FIG. 1 thereof shows a vacuum deaerator 20 according to the invention comprising an enclosed, cylindrically shaped housing or tank 22 including a sidewall 26, an upper or top wall 28 and a basewall 30. The tank is insulated and is constructed preferably of stainless steel or the like material. The tank is evacuated by a vacuum pump or other suitable means (not shown).

A valve mechanism 24 mounted on the upper wall 28 of the tank controls the passage of water from a source (not shown) through an inlet pipe 32, into the tank. The valve mechanism, which is able to close and open the passage, thereby to block or open inlet pipe 32, respectively, is itself controlled by a float 34 mounted on the sidewall 26 of and within the tank 22 near the lower end thereof. The valve mechanism 24 is connected by a fluid carrying line 36 to a pressure diaphragm 38 mounted on the valve assembly. A pressure differentiation in the line caused by the movement of float 34 operates the diaphragm, which in turn opens or closes the valve mechanism.

Mounted within the tank 22, directly beneath the inlet valve mechanism 24, is a first distributing trough or tray 40 which serves to collect water entering the tank. Directly beneath trough 40 is a first plate assembly 42 comprising a plurality of baffled plates 44 (FIG. 2), pairs of which are joined together by welding or other suitable means to provide a plurality of plate pairs, each numbered 46.

Each plate pair 46 includes a plurality of channels running therethrough, each designated by the numeral 48. A first group 43 of the plate pairs 46, seen at the left of FIG. 1, has the channels 48 thereof, respectively, interconnected at the upper and lower ends of the pairs by means of pipes or tubes 50 and 52, respectively. The pipes 50 and 52 are connected to an external supply of heated fluid (not shown) by means of pipes 54 and 56 which extend through sidewall 26 of tank 22. The channels of a second group 45 of the plate pairs are similarly interconnected to an external heated fluid source (not shown). The heated fluid is circulated through the channels of the respective groups of plate pairs to in turn heat the plate assembly 42 to a predetermined temperature, (i.e., approximately 65° F.). This is especially useful in the winter months when water coming from a source entering the tank is generally about 40° F.

While each of the groups 43 and 45 are independently interconnected, a common heated fluid source may be used to supply both of the groups. Also, if desired, an electrical heating element arrangement could be used instead of the circulated fluid, however, this would be more expensive than the heated fluid source.

Beneath the heating plate assembly 42 is a second trough 58, which serves to catch the water which has been heated by passing over the last-mentioned plate assembly, and below trough 58 is a second plate assembly 60, comprising a plurality of plates 62 which also may be divided to form groups, over which the heated water flowing from trough 58 passes to be deaerated. A pipe arrangement 64 located at the lower ends 66 of the deaerating plates 62 serves, in a well-known manner, to remove any foam created in deaerating the water.

Below the pipe arrangement 64 is a third trough 68 into which the deaerated water flowing from plate assembly 60 falls. Trough 68, like trough 58, serves to curtail the increased speed of the water after having traveled over plate assembly 60, and to collect and distribute the water over a third plate assembly 70. The plate assembly 70 is similar to the assembly 42, in that it too comprises a plurality of vertically extending, baffled plates 72 (FIG. 2), pairs of which are welded together to provide a plurality of spaced-apart channeled plate pairs, each numbered 74. As in the case of plate assembly 42, plate assembly 70 is divided into two groups, 71 and 73, respectively. Each of the groups of plate pairs has the channels 84 extending therethrough, interconnected by means of pipes or tubes, such as 76 and 78, respectively, (FIG. 2). These pipes are in turn connected to an external fluid supply (not shown) by means of tubes, such as, 80 and 82, respectively, which extend through sidewall 26 and into the tank 22 and are therein connected to pipes 76 and 78, respectively. In this case, however, a cooled fluid or refrigerant is circulated through the channels 84 so that the plate assembly 70 is cooled to a predetermined temperature, (i.e. between 50° and 65° F.). Thus, deaerated water falling from trough 68 and passing over plate assembly 70 is cooled to a desired temperature. This is especially important in the summer months when water is generally of a higher temperature.

The lower portion 86 of tank 12 serves as a storage area or chamber for water which has been deaerated within tank 22. A pair of inclined troughs 88 and 90, shown in dotted lines, may be provided beneath plate assembly 70 if desired to catch the water falling from the last-mentioned plate assembly, so as to slow the filling of portion 86 and prevent stirring of the water therein.

An outlet pipe 92, connected to the lower wall 30 of tank 22 and communicating with the storage area 86 of tank 22, is provided for removing deaerated water as required. A pump 94 connected to the pipe 92 serves to positively remove water from area 86 of the tank 22, and to pump the water to the carbonation station or the like which follows.

For purposes of affording a more complete understanding of the present invention, a functional description of the vacuum deaerator described heretofore will now be given.

To begin the operation of the vacuum deaerator 20 according to the invention, a quantity of water from a source (not shown) enters pipe 32 and passes through valve assembly 24 into the evacuated tank 22. After the water enters tank 22 it momentarily accumulates in trough 40. From trough 40, the water passes through apertures 41 provided in the base wall thereof (FIG. 2) to be distributed over heated baffled plate assembly 42. As the water passes over the plates 44 of assembly 42, it is heated to a predetermined temperature. The heating of the water is very important in that water of a relatively high temperature is more easily and thoroughly deaerated. As explained above, in the "bottling" of carbonated beverages, much of the beverage is now put into steel cans. Air in the beverage causes rusting of the cans, and this cannot be tolerated since rusting presents an unsanitary and unappealing product.

By heating the water within the vacuum of tank 22 to a sufficiently high temperature it is prepared for a thorough deaeration. The heated water passes from plate assembly 42 into a second trough 58 located therebeneath. The trough 58 momentarily collects the heated water and serves to break the rapid descent of the water, and to redistribute it over vertically extending, spaced-apart deaerating plates 62 of assembly 60. The heated water leaves the trough 58 through appertures 59 in the base wall thereof to run downwardly over plate 62. The exposure of the water to the vacuum within tank 22 as it runs over plate 62 serves to deaerate the water in a well-known manner. Plates 62 of the deaerating plate assembly are not baffled, as shown in the FIGS., but it is understood that they may be so formed. The water, having been heated, is thoroughly deaerated when it arrives at the lower end 66 of plate assembly 60. Any foam accumulating in the water during the deaeration thereof is removed by means of the defoaming arrangement 64 beneath plate assembly 60.

Subsequent to deaerating, the deaerated water falls into a third trough 68. Trough 68 serves, as did trough 58, to break the descent of the water and to redistribute the heated, deaerated water for passage thereof over the cooling plate assembly 70. The water is passed from trough 68 through apertures 69 therein, and is distributed over the plates 72 comprising the assembly 70. Plate assembly 70, which has been cooled to a predetermined temperature by refrigerant flowing therethrough, in turn cools the deaerated water to a temperature ideal for carbonation. The cooling of the water to a predetermined temperature for carbonation thereof is important in the bottling of beverages. Since water is more easily carbonated at a relatively cool temperature, and since the desire of beverage bottlers is to have a uniformly carbonated beverage, the cooling of the water prior to carbonation serves both purposes. When the water has been cooled to a specified temperature, the bottler is insured of a uniformly carbonated final product.

After the water has been treated as described above, it is stored in the lower storage area 86 in the bottom of tank 22 until it is required for use. When needed it is pumped from tank 22 through outlet pipe 92 by means of pump 94.

Thus, the vacuum deaerator according to the invention provides water which has been thoroughly and efficiently deaerated and which is at a temperature suitable for efficient carbonation thereof. Furthermore, the heating, deaerating and cooling of the water in a vacuum deaerator of the type heretofore described takes place entirely within the vacuum of the deaerator; thus, there is no chance that air will recombine with the water at any time during the process. This insures a bottler of having uniformly deaerated water which is ideal for carbonating.

While a particular embodiment of the invention has been shown and described, it should be understood that the invention is not limited thereto since many modifications may be made. It is therefore contemplated to cover by the present application any and all such modifications as fall within the true spirit and scope of the appended claims.

We claim:

1. Deaerating apparatus comprising: an enclosed housing; means for removing air from said housing to provide an evacuated atmosphere therein; an inlet connected to said housing through which water to be deaerated enters said housing, and an outlet for removing deaerated water from said housing; a first, heated plate assembly disposed immediately below said inlet over which said water is flowed to raise its temperature to a predetermined value; a second plate assembly disposed immediately below said first plate assembly and adapted to have the heated water flowed thereover to subject said water to the evacuated atmosphere thereby thoroughly deaerating said water; and a third, cooled plate assembly disposed below said second plate assembly over which said deaerated water is flowed to lower it to a predetermined temperature, such that said water to be deaerated is subjected to the evacuated atmosphere within the housing during the entire time it is flowing over the plate assemblies.

2. Deaerating apparatus as defined in claim 1, further including; a first trough having a perforated base wall and being disposed within said housing immediately above said first, heated plate assembly for accumulating water entering said inlet and distributing said water through said apertures over said first plate assembly; a second trough having a perforated base wall disposed immediately below said first plate assembly for accumulating heated water and distributing same to said second plate assembly; and a third perforated trough disposed intermediate the second and third plate assemblies for distributing water to said third assembly.